(12) United States Patent
Büche et al.

(10) Patent No.: US 10,771,168 B1
(45) Date of Patent: Sep. 8, 2020

(54) RADIO FREQUENCY SIGNAL GENERATING APPARATUS AND RADIO FREQUENCY SIGNAL GENERATING METHOD

(71) Applicant: Rohde & Schwarz GmbH & Co. KG, Munich (DE)

(72) Inventors: Marcus Büche, Olching (DE); Jonas Scherer, Munich (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 0 days.

(21) Appl. No.: 16/281,188

(22) Filed: Feb. 21, 2019

(51) Int. Cl.
*H04B 17/00* (2015.01)
*H04L 25/02* (2006.01)
*H04L 12/28* (2006.01)

(52) U.S. Cl.
CPC ......... *H04B 17/00* (2013.01); *H04L 12/2801* (2013.01); *H04L 25/02* (2013.01)

(58) Field of Classification Search
CPC ...... H04B 17/00; H04L 25/02; H04L 12/2801
See application file for complete search history.

(56) References Cited

U.S. PATENT DOCUMENTS

| | | | |
|---|---|---|---|
| 9,326,174 B1 | 4/2016 | Dark et al. | |
| 9,548,882 B2 | 1/2017 | Dark et al. | |
| 9,609,653 B2 | 3/2017 | Dark et al. | |
| 9,769,006 B2 | 9/2017 | Dark et al. | |
| 9,918,316 B2 | 3/2018 | Dark et al. | |
| 9,979,585 B2 | 5/2018 | Dark et al. | |
| 2005/0041746 A1* | 2/2005 | Rosen | H04B 1/7163 375/242 |
| 2014/0348266 A1* | 11/2014 | Yamanouchi | H04L 27/2614 375/297 |
| 2017/0317766 A1* | 11/2017 | Vella-Coleiro | H04B 17/00 |
| 2019/0214724 A1* | 7/2019 | Schrattenecker | G01S 7/032 |

* cited by examiner

*Primary Examiner* — Kenneth T Lam
(74) *Attorney, Agent, or Firm* — Westman, Champlin & Koehler, P.A.

(57) ABSTRACT

Generating of a broadband signal by generating multiple RF signals having a limited frequency range and combining the multiple RF signals. The generation of the individual RF signals is controlled based on a feedback loop measuring the combination of the multiple RF signals and adjusting at least one operational parameter in a device generating RF signals having the limited bandwidth.

22 Claims, 4 Drawing Sheets

RADIO FREQUENCY SIGNAL GENERATING APPARATUS AND RADIO FREQUENCY SIGNAL GENERATING METHOD

TECHNICAL FIELD

The present invention relates to a radio frequency signal generating apparatus and a radio frequency signal generating method. In particular, the present invention relates to generating a broadband radio frequency signal.

BACKGROUND

Although applicable in principle to any radio frequency signal generating apparatus, the present invention and its underlying problem will be hereinafter described in combination with testing a wireless communication system.

The use of wireless communication systems increases continuously with the advance of high speed wireless data communications. During development and production of devices for communication systems it is necessary to thoroughly test devices for compliance with communication standards. For this purpose, tests may be applied over an increasing frequency range. Thus, testing modern communication systems may require broadband test signals extending over an increasing frequency range. However, generating such broadband test signals with a wide bandwidth may be a big challenge. In particular, the generation of such signals may require complex and expensive components.

Against this background, a problem addressed by the present invention is to provide an improved and versatile generation of broadband signals. In particular, the present invention aims to provide radio frequency signals with a baseband signal extending over a wide frequency range.

SUMMARY

The present invention solves this problem with a radio frequency signal generating apparatus and a radio frequency signal generating method with the features of the independent claims. Further advantageous embodiments are subject matter of the dependent claims.

According to a first aspect, a radio frequency (RF) signal generating apparatus is provided. The RF signal generating apparatus may be used for generating a broadband RF signal. The apparatus comprises a number of at least two signal generating devices, a combiner, a measurement device and a control device. Each of the number of the at least two signal generating devices is configured to generate an RF signal. The combiner is configured to combine the RF signals generated by each of the number of signal generating devices. The combiner is further configured to output a combined RF signal. The measurement device is configured to measure the combined RF signal provided by the combiner. The control device is configured to receive the measured combined RF signal. The control device is further configured to control at least one of the number of signal generating devices. In particular, the control device is configured to control the at least one signal generating device based on the received combined RF signal. Each of the number of signal generating devices comprises a baseband generating device for generating a baseband signal and an RF conversion device for converting the generated baseband signal to an RF signal.

According to a second aspect, an RF signal generating method for generating a broadband RF signal is provided. The method comprises generating a number of at least two RF signals. Each RF signal may be generated by one of a number of signal generating devices. The method further comprises combining the generated number of RF signals. The combining may be performed by a combiner. The method further comprises measuring the combined RF signal. The measuring may be performed by a measurement device. The method further comprises controlling the generation of at least one RF signal based on the measured combined RF signal. The controlling may be performed by a control device. In particular, the generation of each RF signal of the number of at the least two RF signals comprises generating a baseband signal, and converting the generated baseband signal to an RF signal.

The present invention is based on the fact that generating radio frequency signals with a baseband signal extending over a wide frequency range may require a complex hardware. Furthermore, high quality components are required which makes such devices very expensive.

The present invention takes into account this fact and aims to provide an improved, versatile generation of radio frequency signals comprising wide baseband signals. In particular, the present invention suggests to split the generation of broadband signals to multiple generations of radio frequency signals, each relating to a smaller baseband and to combine the separately generated signals. Furthermore, a feedback loop is applied for controlling the generation of the individual radio frequency signals. In this way, the individual radio frequency signals may be generated such that the combination of the individual radio frequency signals appears as a single signal extending over a wide frequency band. For example, the individual radio frequency signals which have to be combined may be controlled such that the transition area between the individual signals in the combined signal fits exactly. For example, amplitude and/or phase of the individual signals may be controlled accordingly. In this way, the resulting combined radio frequency signal may appear as a single radio frequency signal with a wide baseband signal, wherein the baseband signal appears as a single baseband over a wide frequency range.

For generating the broadband radio frequency signal, a number of at least two signal generating devices may be provided. However, it is understood that even more than two signal generating devices may be used. In particular, any number of two, three, four, five or more signal generating devices may be possible. Each of the number of signal generating devices may comprise a baseband generating device and an RF conversion device. Accordingly, the baseband generating devices may generate a baseband signal. The generated baseband signal may be converted to a desired RF by the respective RF conversion device. The detailed generation of the respective baseband signals and the conversion of the baseband signals to the RF signals will be described in more detail below.

The individual RF signals which are generated by the number of signal generating devices may be combined by the combiner to a combined RF signal. In this way, the combined RF signal comprises the baseband signals of all RF signals provided by the number of signal generating devices. Accordingly, the combined RF signal may be a signal which may be considered as a signal comprising a wide baseband signal extending over all of the individual baseband signals provided by the number of signal generating devices.

Since the individual baseband signals of the number of signal generating devices are converted to RF signals individually, the baseband signals of the individual signal generating devices may be converted to different frequencies or frequency ranges. By combining the baseband signals converted to the radio frequencies, an RF signal which extends over a frequency range comprising all these radio frequencies can be achieved.

In order to control the RF signal generation and the operation of the signal generating devices, a feedback loop may be established. This feedback loop may comprise the above-mentioned measuring device which measures the output of the combiner, namely the combined RF signal. The feedback loop further comprises a control device which takes into account the measurement of the combined RF signal and controls at least one of the signal generating devices based on the measured combined RF signal. For example, one or more operational parameters of the respective signal generating device may be adapted. For example, an amplitude of the baseband signal and/or the high frequency signal comprising the baseband signal may be adapted. Furthermore, a phase shift may be applied in order to achieve an optimum transition between the individual signals when combining the RF signals. Furthermore, the operating frequency of the conversion device may be adapted. In this way, it may be possible to achieve an optimum transition between the individual radio frequencies provided by the number of signal generating devices when combining the individual RF signals to the combined RF signal. However, it is understood that any other appropriate operational parameter may be controlled. In particular, the operational parameter may be controlled based on the measured combined RF signal.

The individual devices of the RF signal generating apparatus, in particular the control device, may be realized, for example, by a processing device comprising a processor. For example, a general purpose processor may be provided with appropriate instructions for performing the desired operations. For this purpose, the processor may be coupled with a memory for storing the respective instructions.

Further embodiments of the present invention are subject of further subclaims and the following description referring to the drawings.

In a possible embodiment of the RF signal generating apparatus is each signal generating device configured to generate an RF signal in a different frequency range. Alternatively, each signal generating device may generate an RF signal with a different carrier signal.

By generating the individual RF signals in different frequency ranges, the combination of the individual RF signals may result in an RF signal of an extended frequency range, namely a frequency range comprising all individual frequency ranges. In this way, a combined RF signal with a wide frequency range can be achieved. Accordingly, by using different carrier signals, in particular carrier signals with different frequencies, the baseband signals of the individual baseband generating devices may be converted to different frequencies. Accordingly, the resulting RF signals of the individual signal generating devices may have different frequency ranges. Thus, the combined RF signal may also be an RF signal of a broad frequency range. For example, the carrier signals and/or the resulting frequency range of the individual RF signals may be chosen such that the resulting combined RF signal may have a continuous frequency spectrum over a specific frequency range.

In a possible embodiment, the number of signal generating devices is configured to generate RF signals having an overlapping frequency range.

For example, a frequency range of an RF signal provided by a first signal generating device may overlap with a frequency range of an RF signal provided by a second signal generating device. In particular, the frequency ranges may slightly overlap. Furthermore, it may be also possible that the ending of a first frequency range may fit or at least almost fit a beginning of a frequency range provided by another signal generating device. In this way, a continuous frequency spectrum over a specific frequency range can be achieved.

In a possible embodiment, each RF conversion device may comprise an RF generating device for generating a carrier signal having a predetermined radio frequency. Further, each RF conversion device may comprise a mixer. The mixer may be configured to mix the generated carrier signal and the generated baseband signal of the respective baseband generating device. In this way, an RF signal comprising the baseband signal can be achieved. However, it is understood that any other configuration for converting the baseband signal to a desired RF may be also possible.

In a possible, embodiment, the control device is configured to adjust a phase or an amplitude of the carrier signal generated by the respective frequency generating device.

By adapting the phase and/or the amplitude of the baseband signal in the baseband generating device, it is possible to achieve a continuous transition of the broadband RF signal at the position between neighboring RF signals from the different signal generating devices. In this way, the resulting combined RF signal may be an RF signal which appears to be a broadband RF signal of a single baseband signal having a broad frequency range.

In a possible embodiment, the control device is configured to adjust a phase or an amplitude of the baseband signal generated by the respective baseband generating device.

Similar to the adjustment of the phase and/or the amplitude of the carrier signal, it may be also possible by control the phase and/or the amplitude of the baseband signal such that a continuous transition between the individual signals can be achieved in the resulting combined RF signal.

In a possible embodiment, the signal generating devices comprise an adjustable filter. The control device is configured to adjust a filter characteristic of the adjustable filter. In particular, the adjustment of the filter characteristic may be performed based on the measured combined RF signal.

For example, it may be possible to set the filter characteristic of the filter such that only a predetermined frequency range may be output by the respective signal generating device. Radio frequency components relating to other frequency ranges may be eliminated or at least attenuated by the filter.

In a possible embodiment, the control device is configured to compute individual input signals for each signal generating device. In particular, the individual input signals may be computed based on a predetermined test signal.

For example, the test signal may be a test signal which is provided to the control device. Alternatively, the test signal may be determined by the control device. For example, the test signal may specify a sum of all baseband signals which shall be provided by the individual baseband generating devices. Accordingly, the control device may split the test signal and cause the individual baseband generating devices to generate the respective parts of the test signal.

In a possible embodiment, the test signal may comprise a multi tone signal or a chirp signal.

For example, a multi tone signal may comprise a plurality of specific frequencies. For example, a multi tone signal may comprise a predetermined number of frequencies having specific frequency distances. Accordingly, the control device may split the test signal with the multiple frequencies and cause each of the baseband signal generating devices to generate a part of these frequencies.

A chirp signal may be a signal with an increasing (or decreasing) frequency. In particular, the chirp signal may extend over a wide frequency range. Accordingly, the control device may determine for each baseband signal of the number of signal generating devices an appropriate part of the test signal and cause the respective baseband signal generating device to generate the respective baseband signal.

In a possible embodiment, the measurement device may comprise a spectrum analyzer or a power meter.

A spectrum analyzer may analyze the combined RF signal in order to determine frequency components in a specific frequency range. In particular, the frequency range may relate to the frequency range of the provided combined RF signal. Furthermore, the spectrum analyzer may determine for each identified frequency a corresponding amplitude. Further parameters such as phase or the like may be also determined.

A power meter may only determine an absolute power of a specific frequency or frequency range. In particular, the power meter may not take into account an individual analysis of frequency components of the signal to be analyzed.

In a possible embodiment, the measurement device may be integrated in a housing. The housing may comprise the number of signal generating devices, the combiner and the measurement device. Accordingly, a single housing may be comprising all relevant components of the RF signal generating device.

In an alternative embodiment, the measurement device may be arranged separate to the housing comprising the number of signal generating devices and the combiner. In particular, the measurement device may be a separate device, for example a portable measurement device. At least a probe for measuring the combined RF signal may be a portable component which can be arranged, for example, at an output port of the combiner.

The RF signal generating apparatus may be, for example, an apparatus for providing RF signals which can be used in a measurement system. For example, the RF signal generating apparatus may be a signal generating apparatus for providing test signals for testing a wireless communication system, such as a communication system of a mobile communication network, for example GSM, UMTS, LTE, 5G or the like. However, it is understood that the RF signal generating apparatus may be also used for generating test signals for testing any other kind of radio frequency devices.

With the present invention it is therefore now possible to generate broadband RF signals in an efficient and reliable manner. In particular, the generation of broadband RF signals can be achieved by cheap and reliable components. The individual components, in particular the devices for generating the individual RF signals may be specified for only a limited frequency range. Thus, low tolerances and high quality can be achieved.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments which are specified in the schematic figures of the drawings, in which.

Figure 1:
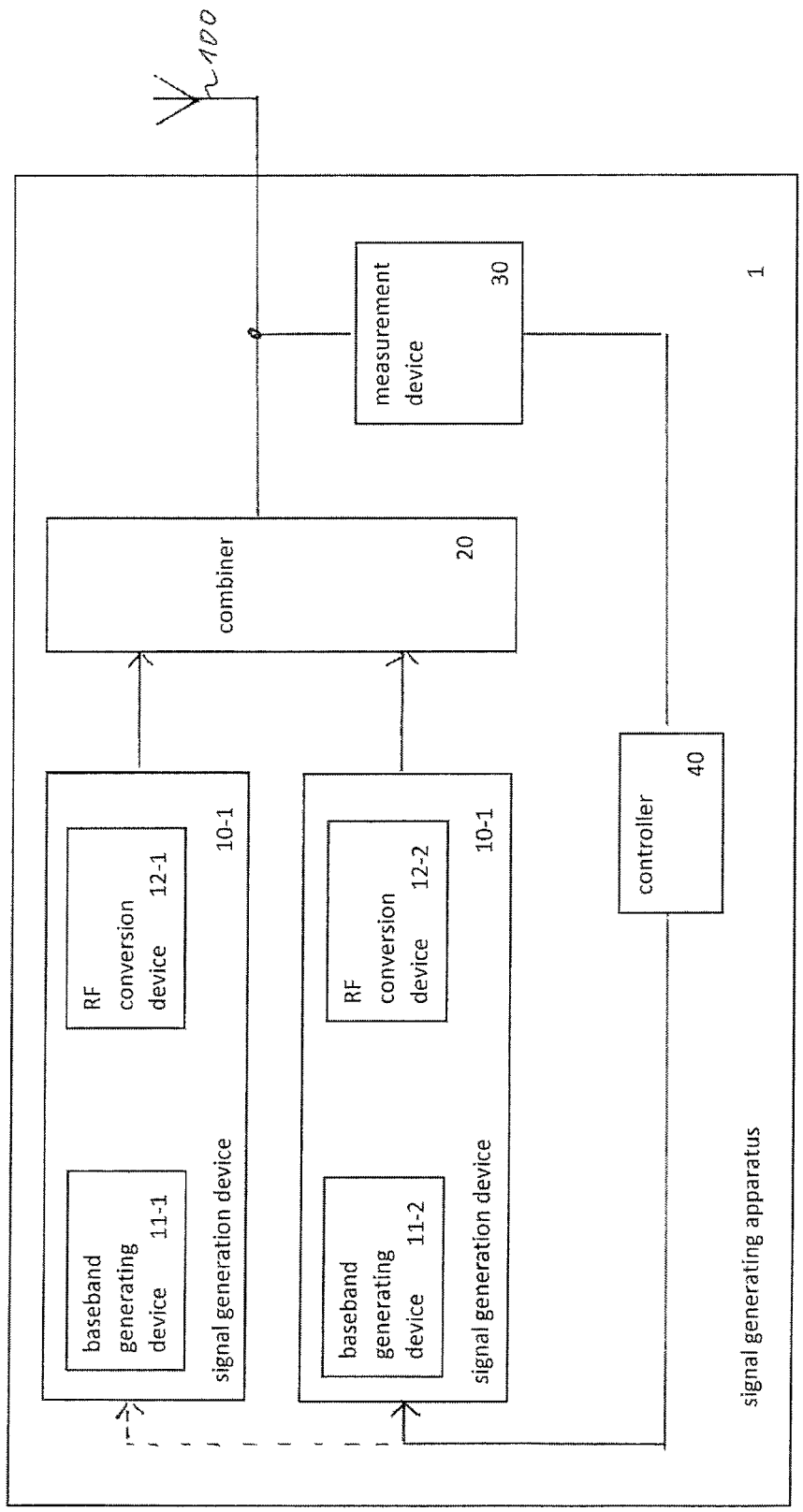
FIG. 1 shows a block diagram of a radio frequency signal generating apparatus according to an embodiment of the present invention.

The appended drawings are intended to provide further understanding of the embodiments of the invention. They illustrate embodiments and, in conjunction with the description, help to explain principles and concepts of the invention. Other embodiments and many of the advantages mentioned become apparent in view of the drawings. The elements in the drawings are not necessarily shown in scale.

In a drawing, same, functionally equivalent and identical operating elements, features and components are provided with same reference signs in each case, unless stated otherwise.

DETAILED DESCRIPTION OF THE DRAWINGS

FIG. 1 shows a block diagram of a radio frequency (RF) signal generating apparatus 1 according to an embodiment. The RF signal generating apparatus 1 in this example comprises a number of at least two signal generating devices 10-$i$, a combiner 20, a measurement device 30 and a control device 40. Even though only two signal generating devices 10-$i$ are shown in FIG. 1, it may be also possible that the RF signal generating apparatus 1 comprises more than two signal generating devices 10-$i$. For example, the RF signal generating apparatus 1 may comprise three, four, five or even more signal generating devices 10-$i$.

Each signal generating device 10-$i$ may generate an individual RF signal. In particular, the individual RF signals provided by the number of signal generating devices 10-$i$ may relate to different RF ranges. For example, the frequency ranges of the individual RF signals provided by the number of signal generating devices 10-$i$ may relate to a number of successive frequency ranges. For instance, a highest frequency component of an RF signal provided by a first signal generating device 10-$i$ may be the same or at least almost the same as a lowest frequency component of a second RF signal generated by a further signal generating device 10-$i$. Alternatively, it may be also possible that the frequency ranges of the individual RF signals generated by the number of signal generating devices 10-$i$ may overlap, at least slightly overlap. The generation of the individual RF signals by the number of signal generating devices 10-$i$ will be described in more detail below.

The RF signals generated by the number of signal generating devices 10-$i$ may be provided to a combiner 20. Thus, combiner 20 may comprise a number of input terminals for receiving the individual RF signals provided by the number of signal generating devices 10-$i$. In particular, the combiner 20 may have a number of input terminals which is equal or higher than the number or signal generating devices 10-$i$. Combiner 20 may combine the RF signals provided by the number of signal generating devices 10-$i$ to a combined RF signal. The combined RF signal may be provided by an output terminal of combiner 20. For example, combiner 20 may add the individual RF signals provided by the number of signal generating devices 10-$i$ for obtaining the combined RF signal. For this purpose, the combiner 20 may have an appropriate hardware structure for combining the RF signals provided by the signal generating devices 10-$i$. A detailed configuration of such combiner is omitted here.

By combining the individual RF signals provided by the number of signal generating devices 10-$i$, the combined RF signal may comprise frequencies of a frequency range of all frequencies included in the individual RF signals of the number of signal generating devices 10-$i$. In this way, the frequency range of the combined RF signal extends over a wide bandwidth. In this way, an RF signal with a wide bandwidth can be achieved by an arrangement of devices having only limited bandwidth. In particular, the generation of the individual RF signals by the number of signal generating devices may be performed by devices having only limited bandwidth.

The combined RF signal which is output by the combiner 20 may be forwarded, for instance, to an antenna 100. However, it is understood that the combined RF signal may be also directly forwarded to another device by a wired connection. For example, the combined RF signal may be used for testing an RF system, for example a wireless communication system or at least a component of a wireless communication system. Any other application, in particular any other kind of test system may be also provided with the combined RF signal.

Furthermore, a feedback loop may be established for controlling the operation of at least one signal generating device 10-$i$ based on the output of the combiner 20.

For this purpose, a measurement device 30 may measure the combined RF signal provided at the output terminal of the combiner 20. The combined RF signal may be measured by a spectrum analyzer and/or a power meter. A power meter may measure a resulting output power of the combined RF signal provided at the output terminal of combiner 20. For example, the power meter may measure the output power or amplitude of the combined RF signal over a predetermined frequency range. Furthermore, it may be possible to perform an individual measurement of power for a plurality of individual frequency ranges. If the measurement device 30 comprises a spectrum analyzer, it may be possible to determine frequencies or frequency ranges covered by the combined RF signal provided by combiner 20. For example, the spectrum analyzer may measure frequency components over a specific frequency range. Furthermore, it may be possible to individually determine an amplitude or power for the identified frequencies in the combined RF signal. However, it is understood that any other kind of measurement may be also applied to the combined RF signal provided by combiner 20.

The measurement result of measurement device 30 may be provided to control device 40. For example, measurement device 30 may be communicatively coupled with control device 40 by a wired or wireless communication link. For this purpose, any kind of communication, for example an Ethernet communication, a serial or parallel communication bus or the like may be used. Control device 40 may receive the measurement results provided by measurement device 30 and may control the operation of at least one of the signal generating devices 10-$i$ based on the received measurement results. For example, control device 40 may be realized by a processing device comprising a processor and a memory for storing instructions which are executed by the processor. For this purpose, the processing device may execute an operating system such as Windows or Linux which loads and executes the instructions stored in the memory of the processing device.

Control device 40 may analyze the measurement result received from measurement device 30 in order to determine one or more operational parameters for the signal generating device 10-$i$. For example, control device 40 may adjust a frequency or frequency range for the RF signal generated by the respective signal generating device 10-$i$. Furthermore, it may possible to adjust an amplitude of the RF signal provided by the respective signal generating device 10-1. For this purpose, it may be possible to an adjust attenuation or amplification factor or to configure any other operational parameter. Furthermore, it may be possible to apply a phase shift or to configure any other operational parameter of the respective signal generating device 10-$i$. In this way, the generation of each RF signal provided by the number of signal generating devices 10-$i$ may be controlled individually, and the resulting combined RF signal may be controlled by controlling the signal generation by the number of signal generating devices 10-$i$.

Each signal generating device 10-$i$ may comprise a baseband generating device 11-$i$ and an RF conversion device 12-$i$. The baseband generating device 11-$i$ may generate a baseband signal. In particular, baseband generating device 11-$i$ may generate a baseband signal having a limited bandwidth relating to the (limited) bandwidth of the respective signal generating device 10-$i$. For example, each baseband generating device 11-$i$ may generate a same or at least similar baseband signal. Alternatively, each baseband generating device 11-$i$ may generate an individual, in particular an individually predetermined baseband signal. Alternatively, it may be also possible that operational parameters for specifying the generation of the respective baseband signal are provided from the control device 40 to the respective baseband generating device 11-$i$. Any other scheme for specifying the generation of the baseband signals by the baseband generating devices 11-$i$ of the number of signal generating devices 10-$i$ may be also possible.

The generated baseband signal of a baseband generating device 11-$i$ may be provided to an RF conversion device 12-$i$ of the respective signal generating device 10-$i$. RF conversion device 12-$i$ may convert the provided baseband signal to an RF signal. In particular, the generated baseband signal may be converted up to a specific radio frequency. For example, the baseband signal may be mixed with an RF carrier signal for converting the baseband signal to the RF signal. This will be described in more detail below. However, any other scheme for converting the baseband signal to an RF signal may be also possible. In particular, each RF conversion device 12-$i$ of the number of signal generating devices 10-$i$ may convert the respective baseband signal to a different radio frequency or radio frequency range. For example, the individual frequency ranges of the RF signals generated by the number of signal generating devices 10-$i$ may provide RF signals of different RF ranges. For example, the individual frequency ranges of the RF signals provided by the number of signal generating devices 10-$i$ may overlap, in particular slightly overlap. Alternatively, it may be also possible that the individual frequency ranges are close to each other or that there may be small gaps between the individual frequency ranges.

The operational parameters of the individual signal generating devices, in particular at least one of the signal generating devices 10-$i$ may be controlled by controller 40. For this purpose, controller 40 may take into account the measurement results provided by measurement device 30 for controlling the operation of one or more signal generating devices 10-$i$. For example, controller 40 may adjust a phase or phase shift, an amplitude, in particular an amplification or attenuation, a specific radio frequency for converting the baseband signal to an RF signal or any other property based on the measurement results provided by measurement device 30. For example, controller 40 may control the generation of the individual RF signal such that the combined RF signal provided by combiner 20 after combining the individual RF signals is an RF signal in which the individual baseband signals of the baseband generating devices 11-*i* appear as a single baseband signal with a wide bandwidth.

Figure 2:
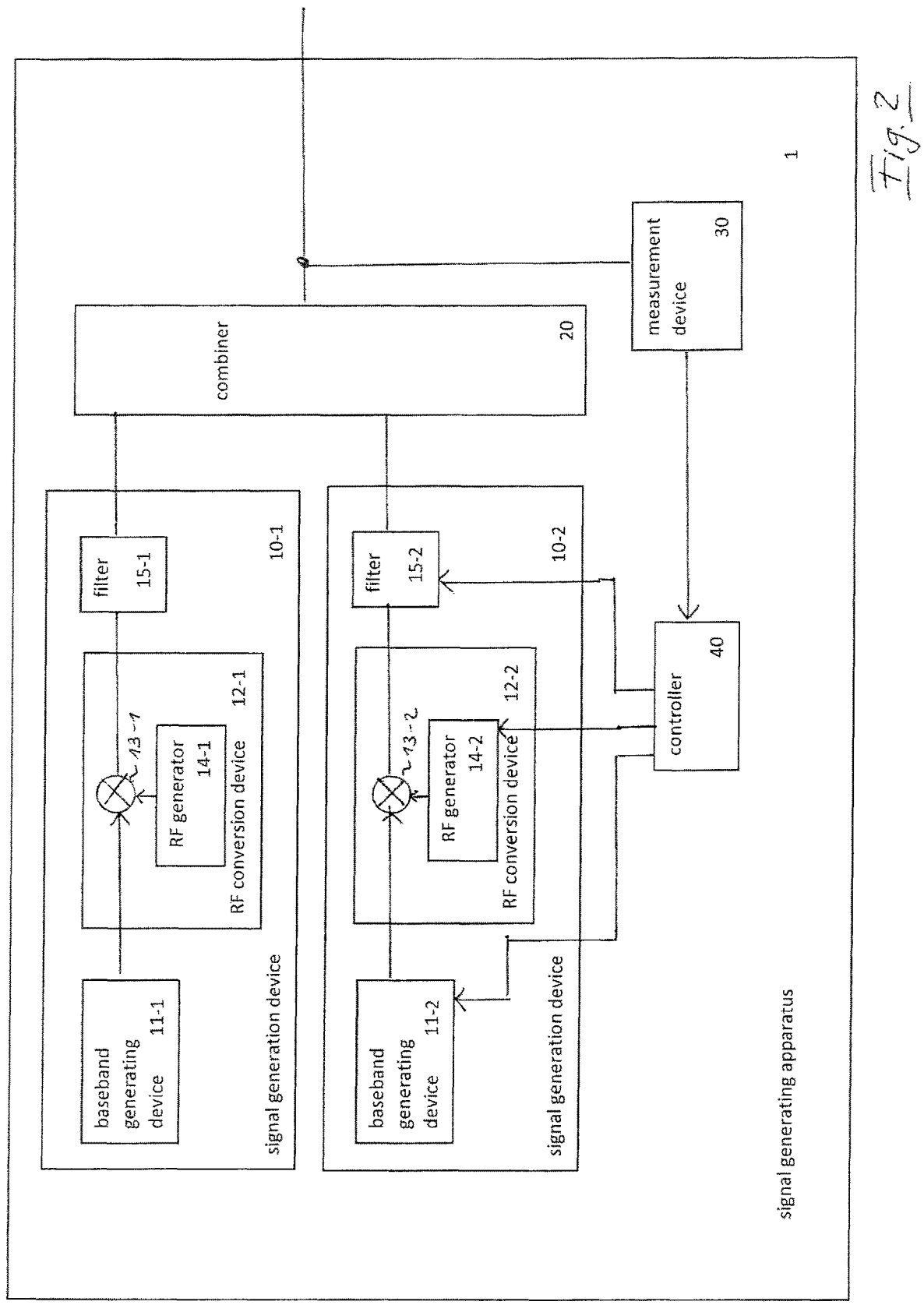
FIG. 2 shows a block diagram of a radio frequency signal generating apparatus according to a further embodiment of the present invention.

FIG. 2 shows a schematic block diagram of an RF signal generating apparatus 1 according to an embodiment. The embodiment according to FIG. 2 mainly corresponds to the previously described embodiment. Thus, the explanation provided above in connection with FIG. 1 also applies to the embodiment according to FIG. 2.

As can be further seen in FIG. 2, the RF conversion device 12-*i* may comprise an RF generating device 14 and a mixer 13. RF generating device 14-*i* may generate an RF carrier signal having a specific RF frequency. For example, the frequency of the RF carrier signal generated by RF generating device 14 may be controlled by control device 40. In particular, a different RF frequency may be set for each RF generating device 14-*i* of the number of signal generating devices 10-*i*. The operating frequency of the individual RF generating devices 14-*i* may be adjusted, for example, based on the measurement results provided by measurement device 30. Furthermore, the RF frequencies may be further set depending on additional properties such as the bandwidth of the baseband signals generated by the baseband generating devices 11-*i*, a desired frequency or frequency range of the combined RF signal or any other constraint. RF generating device 14-*i* may be any kind of device which is appropriate for generating a specific RF signal.

The RF carrier signal provided by RF generating device 14-*i* may be provided to corresponding mixer 13-*i*. Furthermore, the baseband signal generated by the baseband generating device 11-*i* may be also provided to mixer 13-*i*. Accordingly, mixer 13-*i* of signal generating device 10-*i* may mix the baseband signal and the RF carrier signal for obtaining a mixed signal. In this way, an RF signal comprising the generated baseband signal may be obtained. However, it is understood that any other kind of configuration for converting the generated baseband signal to a specific RF signal may be also possible.

The RF signal comprising the baseband signal may be provided to an optional filter 15-*i*. In particular, filter 15-*i* may be an adjustable filter. For example, filter 15-*i* may be a high-pass filter, a low-pass filter or a bandpass filter. The filter characteristics may be configured, for example, by control device 40. For example, control device 40 may set one or more filter frequencies of the filter 15-*i*. In this way, it may be possible to limit the output of signal generating device 10-*i* to a signal of a specific frequency range. However, any other approach for configuring the frequency range of the RF signal provided by the respective signal generating device 10-*i* may be also possible. In particular, the operation of the signal generating devices 10-*i*, especially the filter characteristics of the filters 15-*i*, may be set such that the frequency range of the RF signals provided by the individual signal generating devices 10-*i* may (slightly) overlap or that the individual frequency ranges fit to each other.

Furthermore, control device 40 may specify the individual baseband signals generated by the baseband generating devices 11-*i* of the number or signal generating devices 10-*i*. For example, a given baseband signal may be split into multiple segments. Each segment may be assigned to one of the number of signal generating devices. Accordingly, the baseband generating device 11-*i* of the respective signal generating devices 10-*i* may be configured such that the respective segment is generated by the respective baseband generating device 11-*i*. For this purpose, a desired baseband signal or characteristic parameters of a desired baseband signal may be provided to control device 40. For example, the test signal may be determined or generated by an external test signal generator device 200. Control device 40 may split the desired baseband signal and determine individual segments of the baseband signal which are assigned to each of the number of signal generating devices 10-*i*. Alternatively, it may be also possible that a desired baseband signal is computed within the control device 40, or a pre-stored baseband signal is used by the control device 40 for determining the individual segments of the baseband signal which shall be assigned to the number of signal generating devices 10-*i*.

The desired baseband signal may be any kind of baseband signal. For example, the baseband signal may be a multi tone signal. Accordingly, a number of frequencies may be specified which shall be comprised in the desired baseband signal. In this case, the number of frequencies may be separated into multiple groups, and each group of frequencies may be assigned to one of the number of signal generating devices 10-*i*. In an alternative example, the baseband signal may be a chirp signal, e.g. a signal with an increasing or decreasing frequency. Again, control device 40 may split the desired baseband signal into multiple segments and assign each segment to one of the number of signal generating device 10-*i*. However, it is understood that any other kind of desired baseband signal may be also possible, and the control device 40 may separate the desired baseband signal to individual segments which are assigned to the number of signal generating devices 10-*i*.

The measurement device 30 for measuring the combined RF signal may be any kind of appropriate measurement device. As already described above, measurement device 30 may be, for example, a spectrum analyzer or power meter. In particular, the measurement device 30 may be combined together with the number of signal generating devices 10-I and the combiner 20 in a common housing. The housing may further comprise the control device 40. Alternatively, measurement device 30 may be a measurement device which is arranged separate to the remaining devices of the RF signal generating apparatus 1. In particular, measurement device 30 may be a portable device which can be moved around. For example, measurement device 30 may be a separate power meter or spectrum analyzer. The external spectrum analyzer and/or the external power meter may be communicatively coupled with the internal control device 20.

Figure 3:
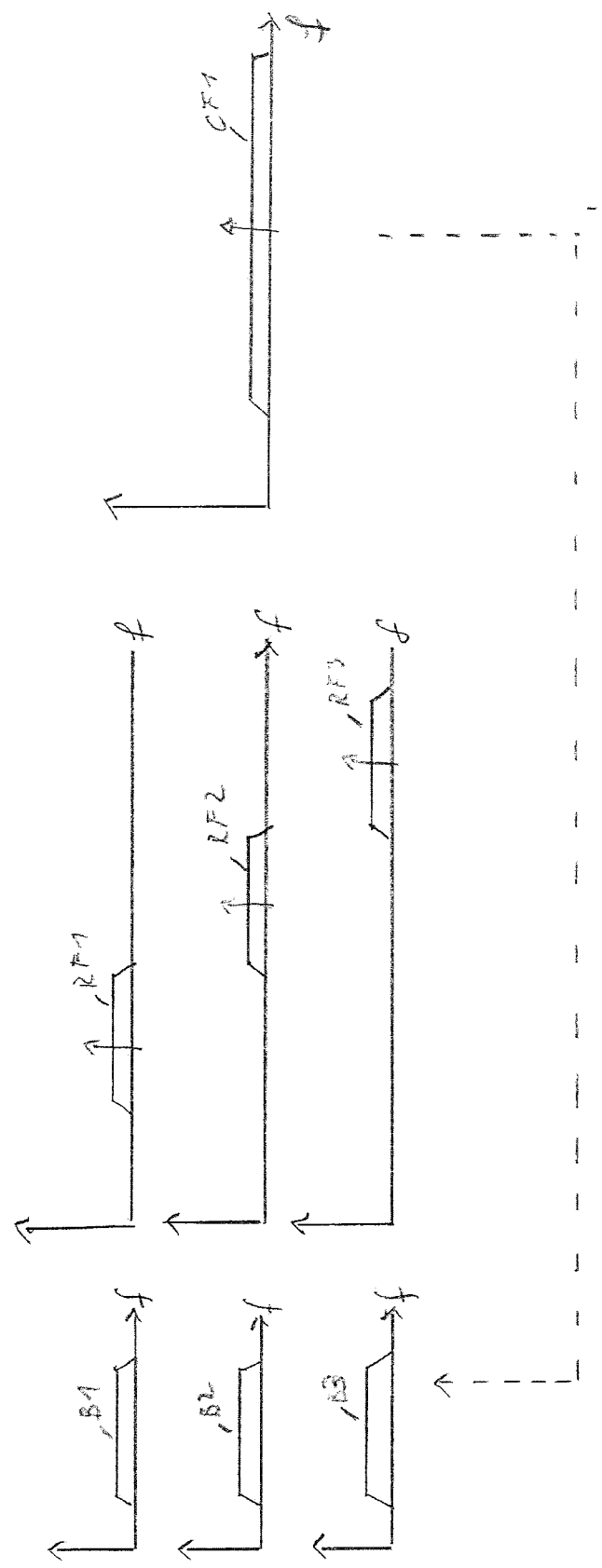
FIG. 3 shows a block diagram illustrating the generation of a broadband signal by an apparatus according to an embodiment.

FIG. 3 shows a schematic illustration for generating a broadband RF signal according to an embodiment. As can be seen on the left hand side of FIG. 3, each baseband generating device 11-*i* may generate an individual baseband signal B1-B3. The number of three baseband signals B1-B3 corresponding to a number of three signal generating devices 10-*i* is only for illustrative purposes and does limit the scope of the present invention. Furthermore, any number of two or more baseband signals may be possible. In particular, each baseband signal B1-B3 may have a limited frequency range. Accordingly, the generation of the baseband signals B1-B3 may be performed by simple and cheap baseband generating devices 11-*i* with high accuracy.

As already explained above, the baseband signals B1-B3 which may be generated by the individual baseband generating devices 11-*i* of the signal generating devices 10-*i* may be converted to RF signals. For example, the first baseband signal B1 may be converted to an RF signal of a first frequency range RF1. For example, the first baseband signal B1 may be converted to a first RF signal with a first RF carrier signal. Accordingly, the second baseband signal B2 may be converted to a second RF signal RF2, and the third baseband signal B3 may be converted to a third RF signal RF3. As can be further seen in the center part of FIG. 3, the individual RF signals RF1-RF3 may be converted to different frequency ranges. Accordingly, different carrier signals may be used for the baseband signals B1-B3. Especially, the frequency range of two RF signals may (slightly) overlap. For example, the ending of a first frequency range of the first RF signal RF1 may overlap with the beginning of a second RF signal RF2. The ending of the frequency range of the second RF signal RF2 may overlap with the beginning of the frequency range of a third RF signal RF3.

The individual RF signals RF1-RF3 may be combined to a single RF signal CRF by combiner 20. Accordingly, combiner 20 may output a combination of the individual RF signals RF1-RF3. Hence, as can be seen in the left hand part of FIG. 3, the resulting combined RF signal CRF may comprise the radio frequency components of the three RF signals RF1-RF3. In this way, a single RF signal with a relative wide frequency range can be achieved by multiple devices dealing only with a limited frequency range.

Furthermore, a feedback loop may be established for measuring the resulting combined RF signal CRF and for controlling the generation of the individual baseband signals B1-B3 and/or the conversion of the baseband signals B1-B3 to the respective RF signals RF1-RF3. As already explained above, the controlling of the generation of the individual RF signals RF1-RF3 may comprise controlling a phase, an amplitude, a frequency or any other property of the individual devices for generating the RF signals RF1-RF3.

Figure 4:
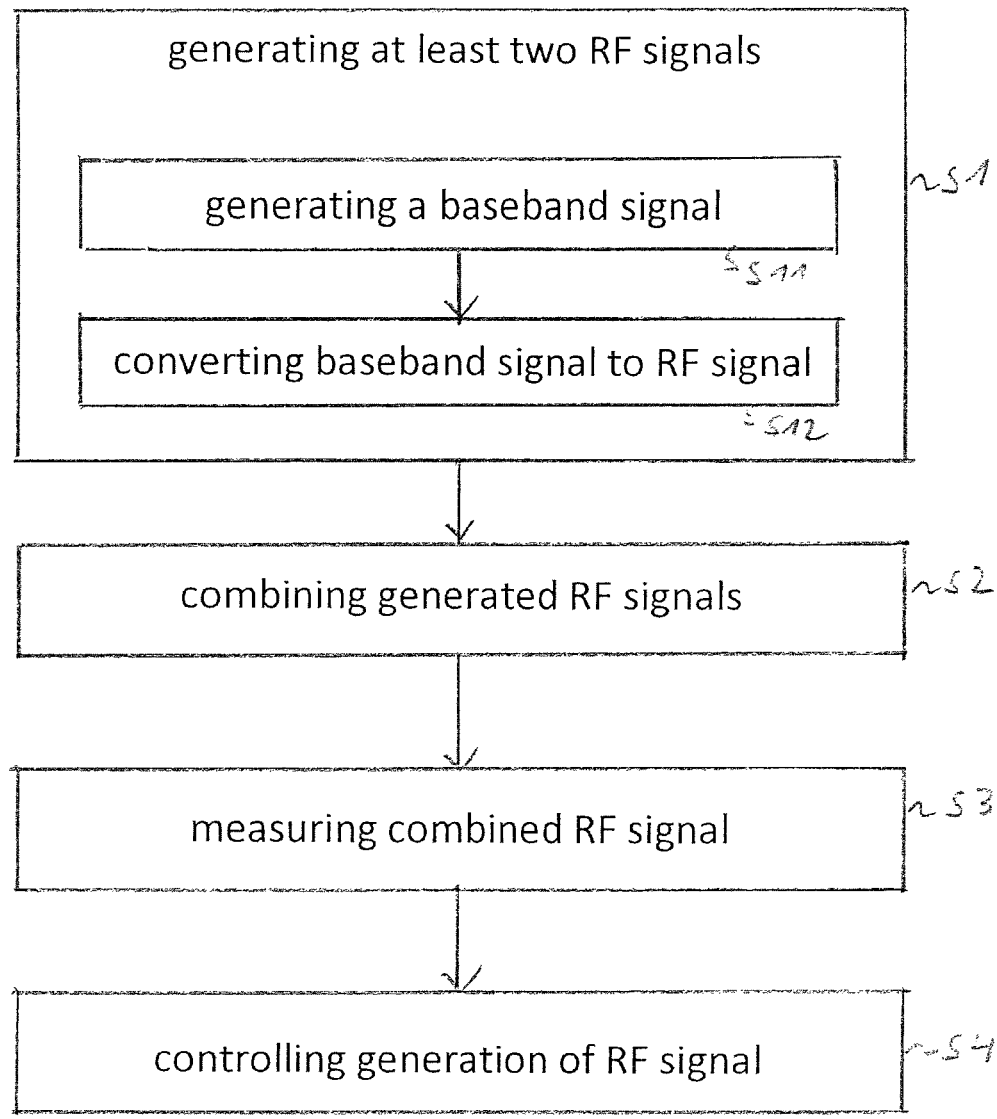
FIG. 4 shows a flow diagram of a radio frequency signal generating method according to an embodiment.

FIG. 4 shows a flow diagram illustrating a method for generating a broadband RF signal according to an embodiment. The method may comprise any method step corresponding to an operation as already explained above in connection with the RF signal generating apparatus 1. The other way around, the above described RF signal generating apparatus 1 may comprise any kind of device for executing an operation corresponding to a method step as described below.

The method for generating a broadband RF signal comprises a step S1 of generating a number of at least two RF signals. Each RF signal of the number of RF signals may be generated by one of a number of signal generating devices 10-*i*. In a step S2 the generated number of RF signals is combined to a single combined RF signal. The combining may be performed by a combiner 20. In a step S3, the combined RF signal is measured. The measuring of the combined RF signal may be performed by a measurement device 30. In a step S4, the generation of at least one RF signal may be controlled based on the measured combined RF signal. The controlling may be performed by a control device 40. In particular, the generation of each RF signal of the number of at least two RF signals may comprise a step S11 of generating a baseband signal and a step S12 of converting the generated baseband signal to an RF signal.

Each RF signal of the number of RF signals may be generated in a different frequency range. Each RF signal may be generated with a different carrier signal.

The number of RF signals may have an overlapping frequency range.

Each converting of the generated baseband signal to an RF signal may comprise generating a carrier signal having a predetermined radio frequency, and mixing the generated carrier signal and the generated baseband signal.

In particular, the generating of the carrier signal may comprise adjusting a phase and/or an amplitude of the generated carrier signal.

The controlling of the generation of the at least one RF signal may comprise adjusting a phase and/or an amplitude of the generated baseband signal.

The generation of the number of the at least two RF signal may comprise adjusting a filter characteristic of an adjustable filter of the respective generating device 10-*i*.

The method may further comprise a step of computing individual input signals for each signal generating device 10-*i*. The computation may be performed, in particular based on a predetermined test signal.

The test signal may comprise a multi tone signal or a chirp signal. However, any other kind of test signal may be also possible.

The measuring of the combined RF signal may be performed by a measurement device, in particular a measurement device comprising a spectrum analyzer and/or a power meter.

The measurement device may be integrated in a housing comprising the number of signal generating devices 10-*i* and the combiner. Alternatively, the measurement device may be arranged separate to the housing comprising the number of signal generating devices and the combiner.

Summarizing, the present invention relates to a generation of a broadband signal by generating multiple RF signals having a limited frequency range and combining the multiple RF signals. The generation of the individual RF signals is controlled based on a feedback loop measuring the combination of the multiple RF signals and adjusting at least one operational parameter in a device generating RF signals having the limited bandwidth.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In the foregoing detailed description, various features are grouped together in one or more examples or examples for the purpose of streamlining the disclosure. It is understood that the above description is intended to be illustrative, and not restrictive. It is intended to cover all alternatives, modifications and equivalents as may be included within the scope of the invention. Many other examples will be apparent to one skilled in the art upon re-viewing the above specification.

Specific nomenclature used in the foregoing specification is used to provide a thorough understanding of the invention. However, it will be apparent to one skilled in the art in light of the specification provided herein that the specific details are not required in order to practice the invention. Thus, the foregoing descriptions of specific embodiments of the present invention are presented for purposes of illustration and description. They are not in-tended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Throughout the specification, the terms "including" and "in which" are used as the plain-English equivalents of the respective terms "comprising" and "wherein," respectively. Moreover, the terms "first," "second," and "third," etc., are used merely as labels, and are not intended to impose numerical requirements on or to establish a certain ranking of importance of their objects.

The invention claimed is:

1. A radio frequency signal generating apparatus for generating a broadband radio frequency signal, the apparatus comprising:
    a number of at least two signal generating devices for generating radio frequency signals;
    a combiner for combining the radio frequency signals generated by each of the number of signal generating devices and outputting a combined radio frequency signal;
    a measurement device for measuring the combined radio frequency signal;
    a control device for receiving the measured combined radio frequency signal and controlling at least one of the number of signal generating devices based on the received combined radio frequency signal,
    wherein each of the number of signal generating devices comprises a baseband generating device for generating a baseband signal, and a radio frequency conversion device for converting the generated baseband signal to a radio frequency signal,
    wherein the measurement device is configured to perform an individual measurement of power for a plurality of individual frequency ranges in the combined radio frequency signal and to individually determine an amplitude or power for the identified frequencies in the combined radio frequency signal, and
    wherein the control device is configured to individually adjust an amplitude of each radio frequency signal generated by the at least one of the number of signal generating devices which are controlled by the control device such that the combined radio frequency signal after combining the individual radio frequency signals is an radio frequency signal in which the individual baseband signals appear as a single baseband signal with a wide bandwidth.

2. The apparatus of claim 1, wherein each signal generating device of the number of signal generating devices is configured to generate a radio frequency signal in a different frequency range or a radio frequency signal with a different carrier signal.

3. The apparatus of claim 1, wherein the number of signal generating devices are configured to generate a number of radio frequency signals having overlapping frequency ranges.

4. The apparatus of claim 1, wherein each radio frequency conversion device comprises:
    a radio frequency generation device for generating a carrier signal having a predetermined radio frequency, and
    a mixer for mixing the generated carrier signal and the generated baseband signal of the respective baseband generating device.

5. The apparatus of claim 4, wherein the control device is configured to adjust a phase or an amplitude of the carrier signal generated by the respective frequency generating device.

6. The apparatus of claim 1, wherein the control device is configured to adjust a phase or an amplitude of the baseband signal generated by the respective baseband generating device controlled by the control device.

7. The apparatus of claim 1, wherein the signal generating devices comprise an adjustable filter, and the control device is configured to adjust at least one filter characteristic of the adjustable filter.

8. The apparatus of claim 1, wherein the control device is configured to compute individual input signals for each signal generating device based on a predetermined test signal.

9. The apparatus of claim 8, wherein the test signal comprises a multitone signal or a chirp signal.

10. The apparatus of claim 1, wherein the measurement device comprises a spectrum analyzer or a power meter.

11. The apparatus of claim 1, wherein the measurement device is integrated in a housing comprising the number of signal generating devices and the combiner.

12. The apparatus of claim 1, wherein the measurement device is arranged separate to the housing comprising the number of signal generating devices and the combiner, in particular, the measurement device is a portable measurement device.

13. A method for generating a broadband radio frequency signal, the method comprising:
    generating a number of at least two radio frequency signals, wherein each radio frequency signal of the number of radio frequency signals is generated by one of a number of signal generating devices;
    combining the generated number of radio frequency signals by a combiner;
    measuring the combined radio frequency signal by a measurement device; and
    controlling the generation of at least one radio frequency signal based on the measured combined radio frequency signal by a control device,
    wherein measuring the combined radio frequency signal comprises performing an individual measurement of power for a plurality of individual frequency ranges in the combined radio frequency signal and individually, determining an amplitude or power for the identified frequencies in the combined radio frequency signal, and
    wherein the generation of each radio frequency signal of the number of at the least two radio frequency signals comprises:
        generating a baseband signal, and
        converting the generated baseband signal to a radio frequency signal, and
        wherein controlling the generation of at least one radio frequency signal comprises individually adjusting an amplitude of the at least one radio frequency signals such that the combined radio frequency signal after combining the individual radio frequency signals is an radio frequency signal in which the individual baseband signals appear as a single baseband signal with a wide bandwidth.

14. The method of claim 13, wherein each radio frequency signal of the number of radio frequency signals is generated in a different frequency range or each radio frequency signal is generated with a different carrier signal.

15. The method of claim 13, wherein the number of radio frequency signals have overlapping frequency ranges.

16. The method of claim 13, wherein each converting the generated baseband signal to a radio frequency signal comprises:
generating a carrier signal having a predetermined radio frequency, and
mixing the generated carrier signal and the generated baseband signal.

17. The method of claim 16, wherein generating a carrier signal comprises adjusting a phase or an amplitude of the generated carrier signal.

18. The method of claim 13, wherein the controlling the generation of at least one radio frequency signal comprises adjusting a phase or an amplitude of the generated baseband signal.

19. The method of claim 13, wherein the generating the number of the at least two radio frequency signals comprise adjusting at least one filter characteristic of an adjustable filter of the respective signal generating device.

20. The method of claim 13, comprising computing individual input signals for each signal generating device based on a predetermined test signal.

21. The method of claim 20, wherein the test signal comprises a multitone signal or a chirp signal.

22. The method of claim 13, wherein the combined radio frequency is measured by the measurement device comprising a spectrum analyzer or a power meter.

* * * * *